H. T. DAHMS.
VEHICLE BRAKE.
APPLICATION FILED FEB. 13, 1914.
1,111,647.
Patented Sept. 22, 1914.
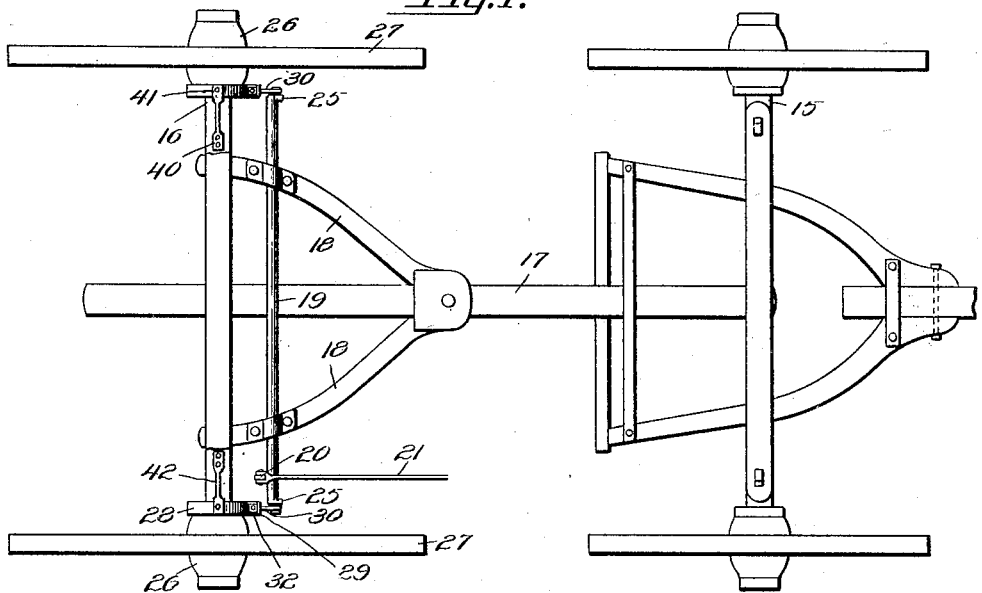
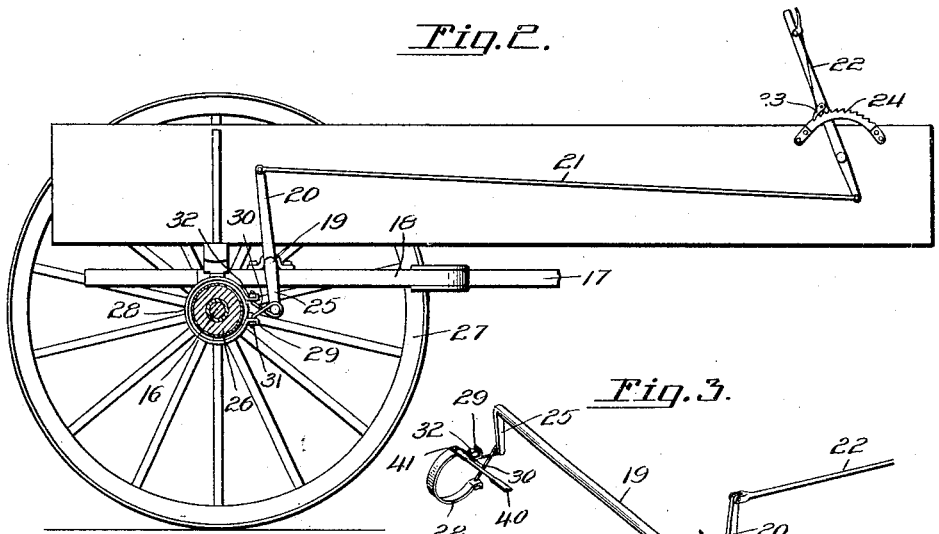
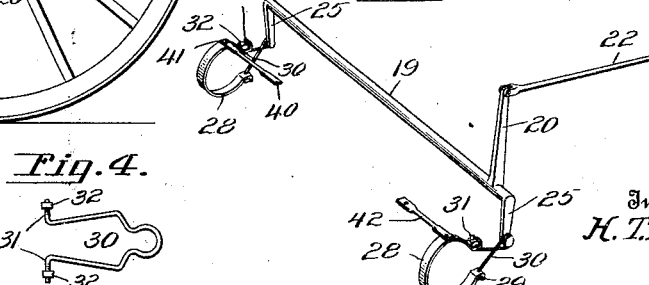
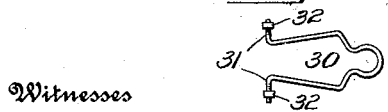
Witnesses
F. C. Gibson.
Wm. Bagger.
Inventor
H. T. Dahms.
By Victor J. Evans
Attorney

UNITED STATES PATENT OFFICE.

HENRY T. DAHMS, OF WALCOTT, IOWA.

VEHICLE-BRAKE.

1,111,647. Specification of Letters Patent. Patented Sept. 22, 1914.

Application filed February 13, 1914. Serial No. 818,549.

*To all whom it may concern:*

Be it known that I, HENRY T. DAHMS, a citizen of the United States, residing at Walcott, in the county of Scott and State of Iowa, have invented new and useful Improvements in Vehicle-Brakes, of which the following is a specification.

This invention relates to vehicle brakes, and it has particular reference to a band brake adapted to be applied to the hubs of wagon wheels.

The invention has for its object to simplify and improve the brake installation and to provide a simple construction for releasing the brake bands from active engagement with the wheel hubs.

A further object of the invention is to produce a simple and efficient means for connecting the brake bands with the operating means, said connecting means serving also to constitute springs for releasing the brake bands from active engagement with the wheel hubs.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a running gear equipped with the improved brake. Fig. 2 is a side elevation of the same. Fig. 3 is a perspective detail view of each of the brakebands and related parts. Fig. 4 is a detail view showing a modification.

Corresponding parts in the several figures are denoted by like characters of reference.

The front and rear axles 15, 16 of an ordinary running gear are connected together by a reach 17.

18 designates the rear hounds which support a rock shaft 19 having an arm or crank 20 which is connected by a rod 21 with the lower end of a hand lever 22, said hand lever being mounted in the customary manner and equipped with a catch member 23 engaging a rack segment 24 for the purpose of retaining the lever and related parts at various adjustments. The rock shaft 19 is provided with downwardly extending arms 25. The hubs 26 of the hind wheels 27 are surrounded by brake bands 28, each brake band having terminal lugs 29. Pivotally mounted upon or connected with each of the crank arms 25 is a spring yoke 30 which may be formed of stout steel wire, and the limbs of which may be crossed, as seen in Fig. 3, or suitably bent, as seen in Fig. 4, said limbs having terminal extensions 31 for engagement with apertures in the lugs 29, said extensions being threaded for the reception of nuts 32 whereby the parts are disassembled.

Secured on the upper face of the rear axle adjacent to the ends thereof are springs 40, said springs being ordinary flat leaf springs that are extended sufficiently to enable their outer ends to be connected with the brake bands 28 by suitable connecting means, such as rivets 41. The springs are reduced to form rounded portions 42 intermediate their ends which will enable them to flex in various directions. These springs will serve not only to maintain the brake bands 28 in proper position with respect to the wheel hubs, but also to assist in releasing or disengaging the brake bands from the hubs when the tension on said brake bands caused by the manipulation of the hand lever 22 is released. The springs 40 may be mounted either on the upper or the rear face of the axle; when they are mounted on the upper face of the axle, the intermediate rounded portion of said springs will enable them to yield or flex forwardly when the brakes are being set, as will be readily understood.

It will be seen that when the parts are properly assembled movement of the hand lever 22 in one direction will oscillate the rock shaft 19 so as to exercise pull in a forward direction on the brake bands through the medium of the yokes 30, thus setting brakes as tightly as may be desired. When the hand lever is moved in the opposite direction, the brake bands will be released from active engagement with the wheel hubs owing to the expansive action of the spring yokes 30.

Having thus described the invention, what is claimed as new, is:—

1. In a vehicle brake, the combination with a running gear, of a rock shaft supported in parallel relation to the rear axle and having terminal arms or cranks, spring yokes connected pivotally with said cranks, and brake bands engaging the hubs of the rear wheels, the terminals of each brake band being connected with the limbs of a spring yoke.

2. In a vehicle brake, the combination with a running gear, of a rock shaft supported in parallel relation to an axle and having terminal cranks and an additional crank intermediate the ends thereof, spring yokes pivoted on the terminal cranks, brake bands engaging the hubs of the wheels on the axle and having terminal lugs, the lugs of each brake band being connected with the limbs of the spring yoke, a hand lever, and a rod connecting the hand lever with the crank intermediate the ends of the rock shaft for oscillating the latter.

In testimony whereof I affix my signature in presence of two witnesses.

HENRY T. DAHMS.

Witnesses:
 GEORGE LUNDEN,
 HENRY HANSEN.

Copies of this patent may be obtained for five cents each, by addressing the "Commissioner of Patents, Washington, D. C."